United States Patent
Zha

(10) Patent No.: US 9,857,626 B1
(45) Date of Patent: Jan. 2, 2018

(54) SUBSTRATES FOR LIQUID CRYSTAL PANELS AND LIQUID CRYSTAL PANELS

(71) Applicant: Wuhan China Star Optoelectronics Technology Co., Ltd., Wuhan, Hubei (CN)

(72) Inventor: Guowei Zha, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/239,677

(22) Filed: Aug. 17, 2016

(30) Foreign Application Priority Data

Jul. 27, 2016 (CN) .......................... 2016 1 06027914

(51) Int. Cl.
*G02F 1/1335* (2006.01)
*G02F 1/1343* (2006.01)

(52) U.S. Cl.
CPC .. *G02F 1/133528* (2013.01); *G02F 1/134336* (2013.01); *G02F 2001/133548* (2013.01); *G02F 2001/134345* (2013.01); *G02F 2203/34* (2013.01)

(58) Field of Classification Search
CPC ......... G02F 1/133528; G02F 1/134336; G02F 2001/133548; G02F 2203/34; G02F 2001/134345
See application file for complete search history.

(56) References Cited

U.S. PATENT DOCUMENTS

2009/0225267 A1 * 9/2009 Atarashiya ........ G02F 1/134363 349/139

* cited by examiner

*Primary Examiner* — Donald Raleigh
*Assistant Examiner* — Kevin Quarterman
(74) *Attorney, Agent, or Firm* — Andrew C. Cheng

(57) ABSTRACT

A substrate of liquid crystal panels includes a glass substrate, and a wire grid layer including a dielectric layer arranged on one side of the glass substrate, and a metal layer on the dielectric layer. The metal layer includes a number of first metal bars and a number of second metal bars. The second metal bars are configured to divide the metal layer into a first area, a second area, and a third area cyclically arranged. The first metal bars are arranged within the first area, the second area, and the third area in sequence, and the first metal bars are parallel to and are spaced apart from each other. The first metal bars within the different areas respectively include a first period, a second period, and a third period different from each other. In addition, the present disclosure also relates to a liquid crystal panel.

10 Claims, 4 Drawing Sheets

SUBSTRATES FOR LIQUID CRYSTAL PANELS AND LIQUID CRYSTAL PANELS

BACKGROUND OF THE INVENTION

1. Field of the Invention

The present disclosure relates to liquid crystal display technology, and more particularly to a substrate for liquid crystal panels, and a liquid crystal panel.

2. Discussion of the Related Art

High gamut display panels are capable of displaying more colors, and are characterized by high color saturation and color reproduction. Thus, the high gamut display panels are favored by consumers.

Currently, display panel manufactures continuously enhance the color gamut in response to the color reproduction demand from consumers. The proposed solutions include adjusting the location of the backlight peak, adopting RG fluorescent powder, adopting quantum dot (QD) backlight technology, and adjusting the location of the band-pass and the width of the half-peak of the color filters. Along with the standard named as REC.2020, the QD backlight technology has been developed. For instance, the companies, such as 3M, nanosys, and QD vision, have spent a lot of efforts with respect to the QD backlight technology. However, the attributes of the color filter has to be evolved while the QD backlight technology realizes the high gamut. Conventionally, the transmission rate of the color filter may be high only within the band-pass width. Complicated manufacturing process with respect to the materials has to be adopted, and the thickness of the color filter has to be huge enough. With such premise, the location of the peak within the band-pass width may be compatible with the peak of the QD backlight. As shown in FIG. 1, the thickness of the combined top polarizer and the color filter is large, which results in an increasing thickness of the liquid crystal display module.

SUMMARY

The present disclosure relates to a substrate for liquid crystal panels, and the liquid crystal panel incorporated with the substrate, wherein the substrate may operate as a color filterer, a polarizer, and a metal electrode. Not only the color saturation and the color reproduction may be enhanced, but also the thickness of the liquid crystal panel may be reduced.

In one aspect, a substrate of liquid crystal panels includes: a glass substrate; a wire grid layer arranged on the glass substrate, the wire grid layer includes: a dielectric layer arranged on one side of the glass substrate; a metal layer arranged on the dielectric layer, the metal layer includes a plurality of first metal bars and a plurality of second metal bars, the second metal bars are configured to intersect with each other to divide the metal layer into a first area, a second area, and a third area cyclically arranged, the first area, the second area, and the third area respectively correspond to sub-pixel areas on an array substrate, the first metal bars are arranged within the first area, the second area, and the third area in sequence, and the first metal bars are parallel to and are spaced apart from each other, the first metal bars within the first area, the second area, and the third area respectively include a first period, a second period, and a third period different from each other, wherein the first period of the first metal bars is defined as a width of the first metal bar plus two gaps between the first metal bar and the two adjacent first metal bars.

Wherein the dielectric layer includes: a first dielectric layer arranged on one side of the glass substrate; a second dielectric layer arranged on the first dielectric layer; a third dielectric layer arranged between the second dielectric layer and the metal layer, wherein a reflective rate of the second dielectric layer is greater than the reflective rate of the first dielectric layer and the third dielectric layer.

Wherein: the first dielectric layer and the third dielectric layer are made by at least one of the silicon oxide, silicon monoxide, and magnesium oxide, and the second dielectric layer is made by at least one of the silicon nitride, titanium dioxide, and titanium pentoxide.

Wherein the second metal bars are arranged along a horizontal direction and a vertical direction, and the second metal bars intersect with each other, and the first metal bars are arranged within the first area, the second area, the third area along the horizontal direction in sequence, and the first metal bars are parallel to each other and are spaced apart from each other.

Wherein the first area, the second area, and the third area respectively correspond to at least one red, at least one green, and at least one blue sub-pixel areas on the array substrate, and the first area, the second area, and the third area are decreased in sequence.

Wherein the first period, the second period, and the third period are in a range from 200 to 500 nm, duty cycle ratios of the first area, the second area, and the third area are in a range from 0.4 to 0.9, and a height of the first metal bar is in a range from 20 to 200 nm, wherein the duty cycle ratio is defined as a ratio of the width of the first metal bar to the period of the first metal bars.

Wherein a band-pass width of a transmission rate of light beams of the substrate of liquid crystal panels is in a range from 20 to 50 nm, and the transmission rate of a central peak of the light beams is greater than 70%.

Wherein the metal layer is made by material selected from aluminum, silver, and gold.

Wherein the width of the first metal bar is smaller than the width of the second metal bar.

In another aspect, a liquid crystal panel includes: a first substrate; a second substrate opposite to the first substrate, the second substrate includes: a glass substrate; a wire grid layer arranged on the glass substrate, the wire grid layer includes: a dielectric layer arranged on one side of the glass substrate; a metal layer arranged on the dielectric layer, the metal layer includes a plurality of first metal bars and a plurality of second metal bars, the second metal bars are configured to intersect with each other to divide the metal layer into a first area, a second area, and a third area cyclically arranged, the first area, the second area, and the third area respectively correspond to sub-pixel areas on an array substrate, the first metal bars are arranged within the first area, the second area, and the third area in sequence, and the first metal bars are parallel to and are spaced apart from each other, the first metal bars within the first area, the second area, and the third area respectively include a first period, a second period, and a third period different from each other, wherein the first period of the first metal bars is defined as a width of the first metal bar plus two gaps between the first metal bar and the two adjacent first metal bars; a liquid crystal layer between the first substrate and the second substrate; and a backlight module arranged below the first substrate.

In view of the above, the band-pass width of the wire grid layer of the second substrate may precisely match with the backlight peak such that the color reproduction of the liquid crystal panel may be greatly enhanced. At the same time, the second substrate 30 includes periodically arranged metal layer and the dielectric layer of the sandwich structure. Thus, the second substrate may operate as the color filter, the polarizer, and the metal electrode. Compared to the conventional configuration of the color filter, the polarizer, and the metal electrode, the proposed solution may greatly reduce the thickness of the second substrate such that the thickness of the liquid crystal panel may be greatly reduced.

DETAILED DESCRIPTION OF THE EMBODIMENTS

Embodiments of the invention will now be described more fully hereinafter with reference to the accompanying drawings, in which embodiments of the invention are shown.

Figure 1:
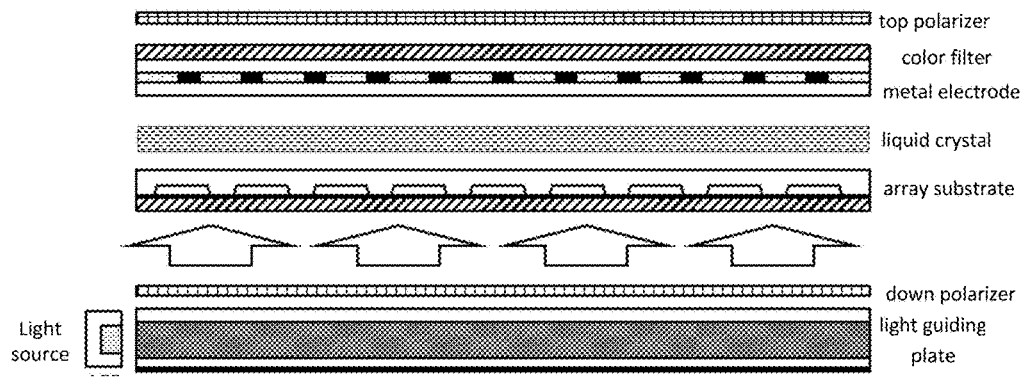
FIG. 1 is a cross-sectional view of one conventional liquid crystal panel.
Figure 2:
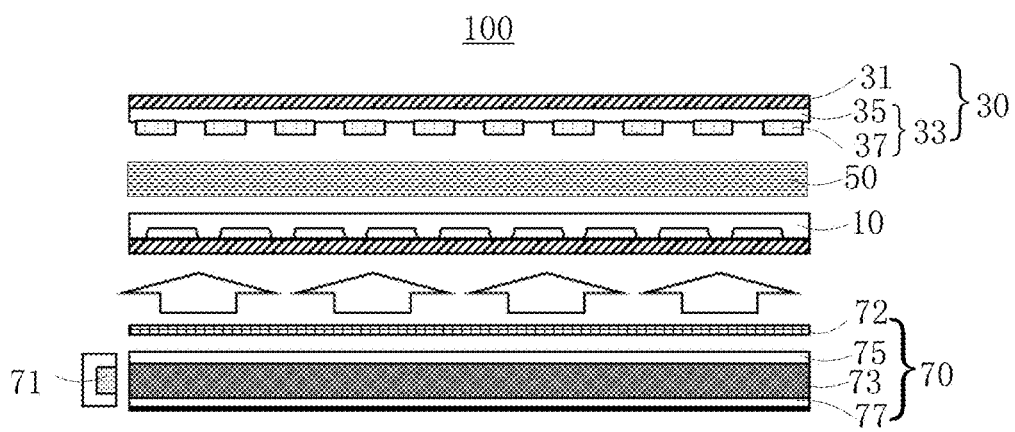
FIG. 2 is a cross-sectional view of the liquid crystal panel in accordance with one embodiment.

FIG. 2 is a cross-sectional view of the liquid crystal panel in accordance with one embodiment. The liquid crystal panel 100 includes a first substrate 10, a second substrate 30, a liquid crystal layer 50, and a backlight module 70. The first substrate 10 is opposite to the second substrate 30. The liquid crystal layer 50 is arranged between the first substrate 10 and the second substrate 30. The backlight module 70 is arranged below the first substrate 10, that is, the backlight module 70 is arranged on a surface of the first substrate 10 facing away the second substrate 30.

The first substrate 10 is an array substrate. It can be understood that the pixel arrangement of the first substrate 10 may be of single-domain or multi-domains.

The second substrate 30 includes a glass substrate 31 and a wire grid layer 33 arranged on a surface of the first substrate 10 facing toward the glass substrate 31.

Figure 3:
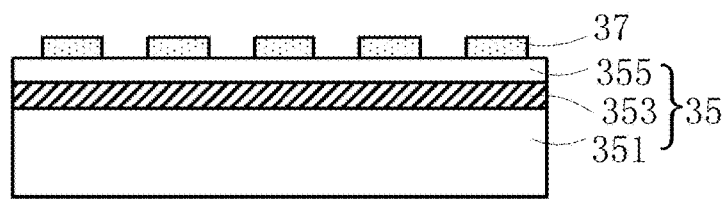
FIG. 3 is a cross-sectional view of the wire grid layer of the liquid crystal panel of FIG. 2.

Referring to FIG. 3, the wire grid layer 33 includes a dielectric layer 35 and a metal layer 37. The dielectric layer 35 is arranged on the surface of the first substrate 10 facing toward the glass substrate 31. The metal layer 37 is arranged on the surface of the dielectric layer 35 facing away the glass substrate 31. The dielectric layer 35 includes a first dielectric layer 351, a second dielectric layer 352, and a third dielectric layer 355. The first dielectric layer 351 is arranged on the surface of the first substrate 10 facing toward the glass substrate 31, the second dielectric layer 352 is arranged on the first dielectric layer 351, and the third dielectric layer 355 is arranged between the second dielectric layer 352 and the metal layer 37, wherein the second dielectric layer 352 may be made by the material having the reflective rate greater than that of the first dielectric layer 351 and the third dielectric layer 355. That is, the dielectric layer 35 is of a sandwich structure having a low-high-low reflective rate. It can be understood that the low and high are considered with respect to the layers. That is, the condition that "the reflective rate of the second dielectric layer 352 is greater than that of the first dielectric layer 351 and the third dielectric layer 355" is not limited to a specific material having a high or low reflective rate.

Further, the first dielectric layer 351 and the third dielectric layer 355 are made by at least one of the silicon oxide, silicon monoxide, and magnesium oxide. The second dielectric layer 352 is made by at least one of the silicon nitride, titanium dioxide, and titanium pentoxide.

Figure 4:
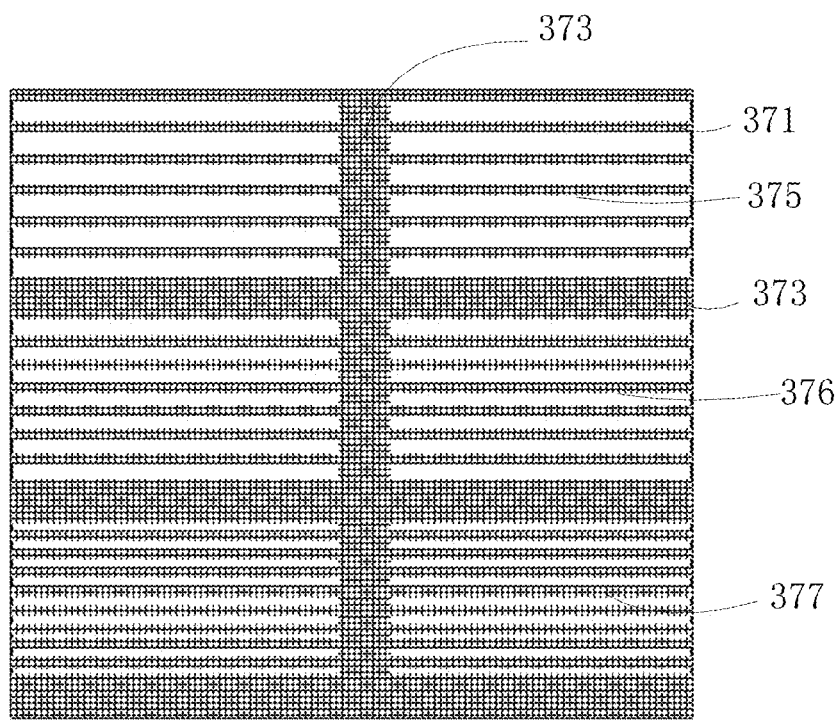
FIG. 4 is a top view of the metal layer of the liquid crystal panel of FIG. 2.

Referring to FIG. 4, the metal layer 37 is arranged on the third dielectric layer 355, the metal layer 37 includes a plurality of first metal bars 371 and second metal bars 373. The second metal bars 373 are configured to intersect with each other so as to divide the metal layer 37 into a first area 375, a second area 376, and a third area 377 cyclically arranged. The first area 375, the second area 376, and the third area 377 respectively correspond to sub-pixel areas on the first substrate 10. The first metal bars 371 are arranged within the first area 375, the second area 376, and the third area 377 in sequence, and the first metal bars 371 are parallel to and are spaced apart from each other. The first metal bars 371 within the first area 375, the second area 376, and the third area 377 respectively include a first period, a second period, and a third period different from each other, wherein the first period of the first metal bars 371 is defined as a width of the first metal bar 371 plus two gaps between the first metal bar 371 and the two adjacent first metal bars 371.

In the embodiment, the second metal bars 373 are arranged along a horizontal direction and a vertical direction, and the second metal bars 373 intersect with each other. The first metal bars 371 are arranged within the first area 375, the second area 376, and the third area 377. The first metal bars 371 are parallel to each other and are spaced apart from each other along the horizontal direction. The first area 375, the second area 376, and the third area 377 respectively correspond to the red, the green, and the blue sub-pixel areas on the first substrate 10. In addition, the first period, the second period, and the third period respectively corresponding to the first area 375, the second area 376, and the third area 377 are decreased in sequence. In addition, the first period, the second period, and the third period are in a range from 200 to 500 nm. The duty cycle ratios of the first area 375, the second area 376, and the third area 377 are in a range from 0.4 to 0.9. The height of the first metal bars 371 is in a range from 20 to 200 nm to balance the extinction ratio and the transmission absorption within the polarized performance of the metal layer 37, wherein the duty cycle ratio is defined as a ratio of the width of the first metal bar 371 to the period of the first metal bars 371. The extinction ratio is defined as the transmission rate of the TM polarized beam to the transmission rate of the TE polarized beam, that is, TTM polarized beam/TTE polarized beam.

It can be understood that the periods of the first area 375, the second area 376, and the third area 377 are configured to be different such that band-pass widths, such as red, green, and blue, on different locations may be configured to be different. In addition, the second metal bars 373 are configured to reflect the light.

It can be understood that the distances between the first metal bars 371 within the first area 375, the second area 376, and the third area 377 are smaller, such that the metal layer 37 may operate as a metal electrode.

It can be understood that the band-pass width of the transmission rate of the light beams of the second substrate 30 is in a range from 20 to 50 nm, and the transmission rate of the central peak of the light beams is greater than 70%.

It can be understood that the first metal bars 371 may extend along a direction other than the horizontal direction, and the second metal bars 373 may extend along not only along the horizontal direction and the vertical direction.

The metal layer 37 may be made by material having a greater imaginary part of reflective index, and may be selected at least one from aluminum, silver, and gold.

As the second substrate 30 includes a periodically arranged metal layer 37 and the dielectric layer 35 of the sandwich-structure, the metal layer 37 and the dielectric layer 35 support the plasma modes. The free space optical field is coupled via periodic grating structures within the wire grid layer 33 and the plasma modes. When the above two engage with each other, obvious punch-through effects of the optical field may be shown. Thus, the wire grid layer 33 may operate as the color filter, and the band-pass range may be configured by the parameters of the wire grid layer 33.

In addition, when the TE polarized beams having the polarized direction parallel to the first metal bars 371 enter the metal layer 37, electrons may freely oscillate along the extending direction of the first metal bars 371, and the TE polarized beams are reflected. With respect to the TM polarized beams having the polarized direction perpendicular to the first metal bars 371, as the width of the metal layer 37 is smaller than the wavelength of the incident beams, the oscillation of the electrons along the direction is limited, and thus the TM polarized beams may pass through directly. Thus, the periodic structure of the wire grid layer 33 and the two-domains arrangement result in a high extinction ratio of the TM and TE optical fields. As such, the wire grid layer 33 operates as a polarizer.

The liquid crystal layer 50 may be of Vertical Alignment (VA) mode, Twisted Nematic (TN), In-Plane Switching (IPS) mode, and Fringe Field Shift (FFS) mode.

The backlight module 70 includes a light source 71, a down polarizer 72, a light guiding plate 73, an optical film 75, and a reflector 77. The down polarizer 72 is arranged on one side of the first substrate 10 facing away the second substrate 30. The optical film 75 and the reflector 77 are respectively adhered to two opposite surfaces of the light guiding plate 73, wherein the optical film 75 is arranged to be close to the down polarizer 72. The light source 71 is arranged on one side of the light guiding plate 73. The light source 71 is a common light source for displaying high color gamut, including blue LED excitation phosphors (RG) and quantum dots film (QD film).

Figure 5:
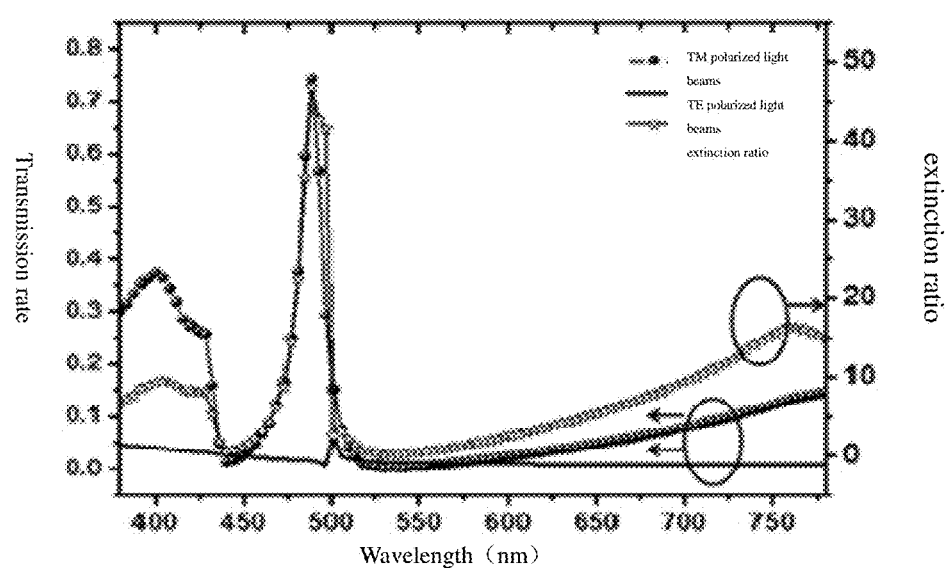
FIG. 5 is a schematic view showing the density contrastness of the second substrate (TM) and the transmission spectrum of the TE polarized beams of the liquid crystal panel in accordance with one embodiment.

FIG. 5 is a schematic view showing the density contrastness of the second substrate (TM) and the transmission spectrum of the TE polarized beams of the liquid crystal panel in accordance with one embodiment, wherein the x-axis relates to the wavelength, and the left y-axis relates to the transmission rate, and the right y-axis relates to the extinction ratio. It can be seen from FIG. 5 that the transmission rate of the band-pass peak of the TM polarized beams may be as high as 75%, the band-pass width is only 17 nm, and the transmission rate of the TE polarized beams is lower than 6%. In addition, within a specific wavelength, the extinction ratio may be higher such that the wire grid layer may operate as the polarizer.

It can be understood that when the TE polarized beams having the polarized direction parallel to the first metal bars 371 enter the metal layer 37, electrons may freely oscillate along the extending direction of the first metal bars 371, and the TE polarized beams are reflected. With respect to the TM polarized beams having the polarized direction perpendicular to the first metal bars 371, as the width of the metal layer 37 is smaller than the wavelength of the incident beams, the oscillation of the electrons along the direction is limited, and thus the TM polarized beams may pass through directly. As a result, the wire grid layer 33 includes a greater band-pass transmission rate with respect to TM, and the light beams are blocked within the visible wavelength with respect to TE.

Figure 6:
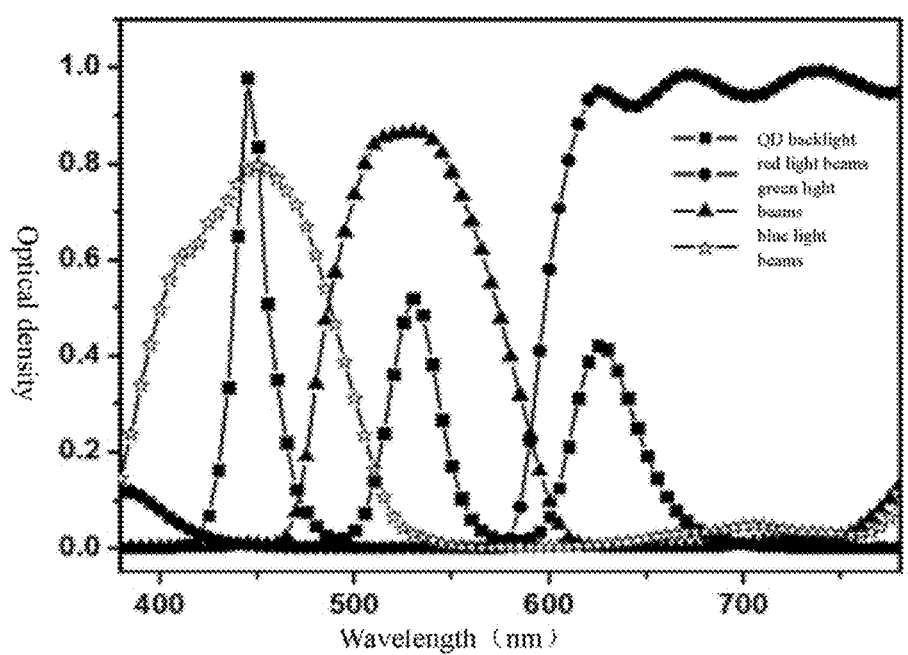
FIG. 6 is a spectrum diagram showing the CF spectrum and the QD spectrum of the conventional liquid crystal panel.

FIG. 6 is a spectrum diagram showing the CF spectrum and the QD spectrum of the conventional liquid crystal panel, wherein the x-axis relates to the wavelength, and the y-axis relates to the optical density. In view of FIG. 6, the band-pass width of the QD backlight peak is narrower, which may be only in a range from 20 to 40 nm, and thus the color purity is high. However, the band-pass widths of the red, green, and blue lights are greater within a specific wavelength range, and thus are not able to match with the QD backlight peak, wherein the band-pass width is defined as the spectrum width at the half peak.

It can be understood that QD backlight solution may realize high color gamut for the reason that the red, green, and blue wavelength may be precisely adjusted by configuring the dimension of the QDs so as to enhance the color reproduction. However, as the band-pass widths of conventional red, green, and blue light beams are greater such that it is difficult to match the band-pass peak and the QD backlight peak via manufacturing process of material. Currently, the color gamut of liquid crystal panel may be enhanced by increasing the thickness of the color filter so as to reduce the band-pass width. However, such solution may result in a thicker color filter, which may reduce the overall transmission rate.

Figure 7:
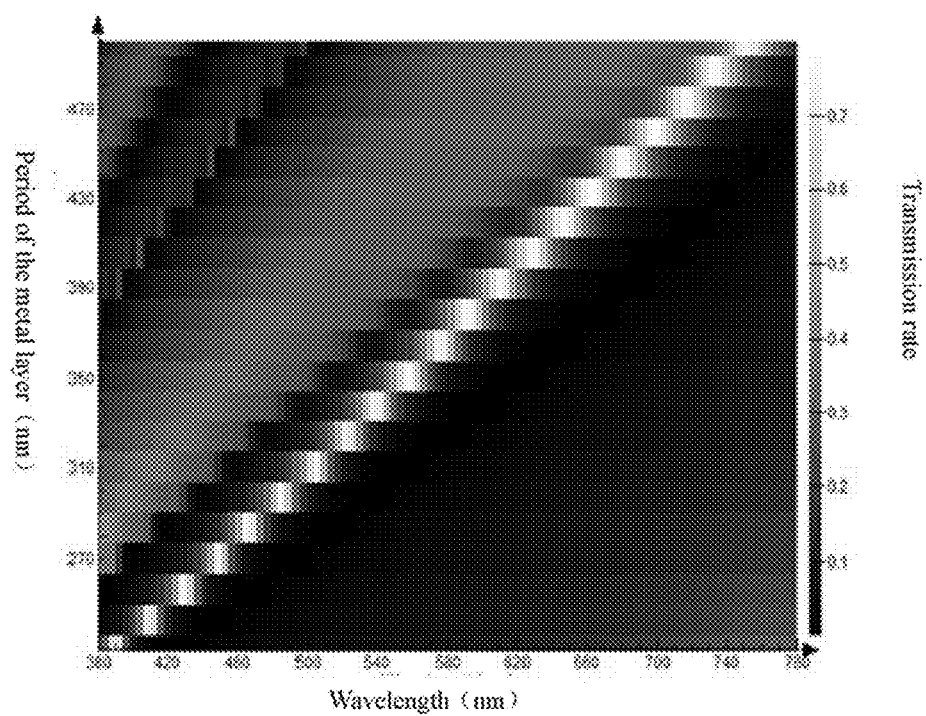
FIG. 7 is a schematic view showing the relationship between the transmission rate of the TE polarized beams, the period of the metal layer, and the wavelength in accordance with one embodiment.

FIG. 7 is a schematic view showing the relationship between the transmission rate of the TE polarized beams, the period of the metal layer, and the wavelength in accordance with one embodiment. In view of FIG. 7, the transmission rate of the TM polarized beams may increase along with the increasing period of the 371 increasing period of the 371 of the metal layer 37. In addition, the band-pass peak may be shifted rightward, that is, the band-pass peak may be shifted toward a direction relating to a greater wavelength. As such, the density of the red, green, and blue may be matched with the QD backlight peak by configuring the relationship between the period of the metal layer, and the transmission rate and the wavelengths of the TM polarized beams.

Figure 8:
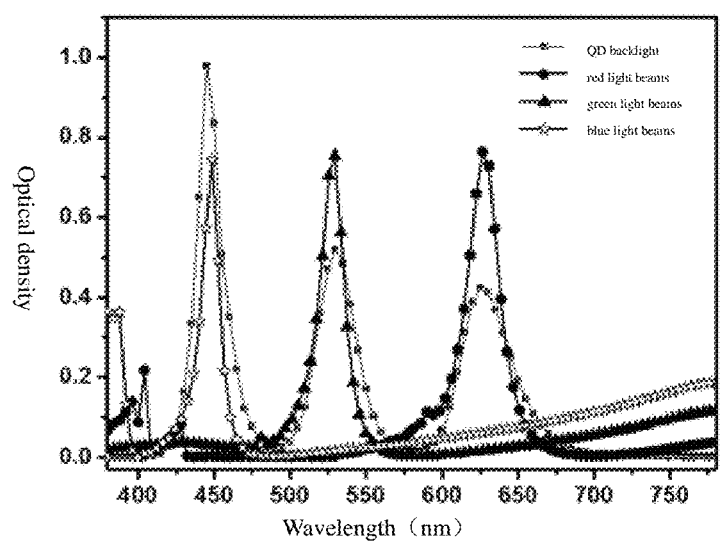
FIG. 8 is schematic view showing the CF spectrum and the QD spectrum of the liquid crystal panel in accordance with one embodiment.

FIG. 8 is schematic view showing the CF spectrum and the QD spectrum of the liquid crystal panel in accordance with one embodiment, wherein the x-axis relates to the wavelength, and the y-axis relates to the optical density. The QD backlight peak and the band-pass width of FIG. 8 are the same with that in FIG. 6. However, the optical density of the red, green, and the blue lights match with the QD backlight peak respectively within the corresponding wavelength range. In addition, as the band-pass range may match with the band-pass range of the QD backlight well, the gamut of the liquid crystal panel 100 may be greatly enhanced.

In view of the above, the band-pass width of the wire grid layer 33 of the second substrate 30 may precisely match with the backlight peak such that the color reproduction of the liquid crystal panel 100 may be greatly enhanced. At the same time, the second substrate 30 includes periodically arranged metal layer 37 and the dielectric layer 35 of the sandwich structure. Thus, the second substrate 30 may operate as the color filter, the polarizer, and the metal electrode. Compared to the conventional configuration of the color filter, the polarizer, and the metal electrode, the proposed solution may greatly reduce the thickness of the second substrate such that the thickness of the liquid crystal panel 100 may be greatly reduced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A substrate of liquid crystal panels, comprising:
   a glass substrate;
   a wire grid layer arranged on the glass substrate, the wire grid layer comprises:
   a dielectric layer arranged on one side of the glass substrate;
   a metal layer arranged on the dielectric layer, the metal layer comprises a plurality of first metal bars and a plurality of second metal bars, the second metal bars are configured to intersect with each other to divide the metal layer into a first area, a second area, and a third area cyclically arranged, the first area, the second area, and the third area respectively correspond to sub-pixel areas on an array substrate, the first metal bars are arranged within the first area, the second area, and the third area in sequence, and the first metal bars are parallel to and are spaced apart from each other, the first metal bars within the first area, the second area, and the third area respectively comprise a first period, a second period, and a third period different from each other, wherein the first period of the first metal bars is defined as a width of the first metal bar plus two gaps between the first metal bar and the two adjacent first metal bars.

2. The substrate of liquid crystal panels as claimed in claim 1, wherein the dielectric layer comprises:
   a first dielectric layer arranged on one side of the glass substrate;
   a second dielectric layer arranged on the first dielectric layer;
   a third dielectric layer arranged between the second dielectric layer and the metal layer, wherein a reflective rate of the second dielectric layer is greater than the reflective rate of the first dielectric layer and the third dielectric layer.

3. The substrate of liquid crystal panels as claimed in claim 2, wherein the first dielectric layer and the third dielectric layer are made by at least one of the silicon oxide, silicon monoxide, and magnesium oxide, and the second dielectric layer is made by at least one of the silicon nitride, titanium dioxide, and titanium pentoxide.

4. The substrate of liquid crystal panels as claimed in claim 1, wherein the second metal bars are arranged along a horizontal direction and a vertical direction, and the second metal bars intersect with each other, and the first metal bars are arranged within the first area, the second area, the third area along the horizontal direction in sequence, and the first metal bars are parallel to each other and are spaced apart from each other.

5. The substrate of liquid crystal panels as claimed in claim 1, wherein the first area, the second area, and the third area respectively correspond to at least one red, at least one green, and at least one blue sub-pixel areas on the array substrate, and the first area, the second area, and the third area are decreased in sequence.

6. The substrate of liquid crystal panels as claimed in claim 5, wherein the first period, the second period, and the third period are in a range from 200 to 500 nm, duty cycle ratios of the first area, the second area, and the third area are in a range from 0.4 to 0.9, and a height of the first metal bar is in a range from 20 to 200 nm, wherein the duty cycle ratio is defined as a ratio of the width of the first metal bar to the period of the first metal bars.

7. The substrate of liquid crystal panels as claimed in claim 1, wherein a band-pass width of a transmission rate of light beams of the substrate of liquid crystal panels is in a range from 20 to 50 nm, and the transmission rate of a central peak of the light beams is greater than 70%.

8. The substrate of liquid crystal panels as claimed in claim 1, wherein the metal layer is made by material selected from aluminum, silver, and gold.

9. The substrate of liquid crystal panel as claimed in claim 1, wherein the width of the first metal bar is smaller than the width of the second metal bar.

10. A liquid crystal panel, comprising:
    a first substrate;
    a second substrate opposite to the first substrate, the second substrate comprises:
    a glass substrate;
    a wire grid layer arranged on the glass substrate, the wire grid layer comprises:
    a dielectric layer arranged on one side of the glass substrate;
    a metal layer arranged on the dielectric layer, the metal layer comprises a plurality of first metal bars and a plurality of second metal bars, the second metal bars are configured to intersect with each other to divide the metal layer into a first area, a second area, and a third area cyclically arranged, the first area, the second area, and the third area respectively correspond to sub-pixel areas on an array substrate, the first metal bars are arranged within the first area, the second area, and the third area in sequence, and the first metal bars are parallel to and are spaced apart from each other, the first metal bars within the first area, the second area, and the third area respectively comprise a first period, a second period, and a third period different from each other, wherein the first period of the first metal bars is defined as a width of the first metal bar plus two gaps between the first metal bar and the two adjacent first metal bars;
    a liquid crystal layer between the first substrate and the second substrate; and
    a backlight module arranged below the first substrate.

* * * * *